United States Patent
Rimini et al.

(10) Patent No.: US 9,490,855 B1
(45) Date of Patent: Nov. 8, 2016

(54) METHOD AND APPARATUS FOR SELF-DIRECTED INTERFERENCE CANCELLATION FILTER MANAGEMENT

(71) Applicant: QUALCOMM Incorporated, San Diego, CA (US)

(72) Inventors: Roberto Rimini, San Diego, CA (US); Nicholas Michael Carbone, San Diego, CA (US); Taesang Yoo, Riverside, CA (US); Muhammad Abdelghaffar, Irvine, CA (US); Sung Hwang, San Jose, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/841,798

(22) Filed: Sep. 1, 2015

(51) Int. Cl.
| | |
|---|---|
| *H03D 1/04* | (2006.01) |
| *H03D 1/06* | (2006.01) |
| *H03K 5/01* | (2006.01) |
| *H03K 6/04* | (2006.01) |
| *H04B 1/10* | (2006.01) |
| *H04L 1/00* | (2006.01) |
| *H04L 25/08* | (2006.01) |
| *H04B 17/336* | (2015.01) |
| *H04L 12/26* | (2006.01) |
| *H04L 25/03* | (2006.01) |

(52) U.S. Cl.
CPC .......... *H04B 1/1036* (2013.01); *H04B 17/336* (2015.01); *H04L 25/03006* (2013.01); *H04L 43/16* (2013.01)

(58) Field of Classification Search
CPC H04B 1/1036; H04B 17/336; H04B 1/1027; H04B 1/525; H04B 1/719; H04B 15/00; H04B 3/23; H04L 43/16; H04L 25/03006
USPC ....... 375/219, 220, 222, 221, 346, 350, 229, 375/232; 455/296; 370/218, 286, 289
See application file for complete search history.

(56) References Cited

U.S. PATENT DOCUMENTS

| | | | |
|---|---|---|---|
| 6,894,989 B1 * | 5/2005 | Chadha | H04B 3/23 370/289 |
| 8,223,960 B2 * | 7/2012 | You | H04B 3/23 370/286 |
| 8,718,178 B1 | 5/2014 | Carbone et al. | |
| 8,830,934 B2 | 9/2014 | Banister et al. | |
| 2008/0084917 A1 * | 4/2008 | Sung | H04B 1/719 375/130 |
| 2012/0163210 A1 | 6/2012 | Yun | |

(Continued)

*Primary Examiner* — Phuong Phu
(74) *Attorney, Agent, or Firm* — The Marbury Law Group, PLLC (57) ABSTRACT

Embodiments include systems and methods for managing an adaptive interference filter performed by a device processor of a mobile communication device. A device processor may determine whether a transmission power from the mobile communication device is greater than or equal to a transmit power threshold. The device processor may determine whether a ratio of interference in a received signal to a level of the received signal including noise (interference ratio) is greater than or equal to an interference ratio threshold in response to determining that the transmission power is greater than or equal to the transmit power threshold. The device processor may perform interference cancellation with the adaptive interference filter in response to determining that the interference ratio is greater than or equal to the interference ratio threshold. In some embodiments the adaptive interference filter may be a non-linear interference cancellation filter.

30 Claims, 5 Drawing Sheets

(56) References Cited

U.S. PATENT DOCUMENTS

2014/0010267 A1    1/2014  Jacob et al.
2014/0099893 A1*   4/2014  Kheirkhahi ............ H04B 1/525
                                                        455/41.2
2014/0177483 A1    6/2014  Jones et al.
2014/0198691 A1*   7/2014  Oberhammer ......... H04B 15/00
                                                        370/281
2015/0126146 A1*   5/2015  Wang ................... H04B 1/1027
                                                        455/296

* cited by examiner

METHOD AND APPARATUS FOR SELF-DIRECTED INTERFERENCE CANCELLATION FILTER MANAGEMENT

BACKGROUND

A mobile communication device may have two or more radio frequency (RF) communication circuits or "RF resource chains," which the mobile communication device may use for reception and transmission of RF signals. Some mobile communication device may include one or more subscriber identity modules (SIMs), which the mobile communication device may use to communicate with one or more cells of a wireless communication network. In some cases, each subscription on the mobile communication device may use an RF resource chain to communicate with its communication network.

The simultaneous use of two or more RF resource chains located in close proximity may cause one RF resource chain to desensitize another RF resource chain, interfering with the ability of the desensitized RF resource chain to receive a signal. In particular, transmission on one RF resource chain may cause interference with reception by another nearby RF resource chain. Receiver desensitization or degradation of receiver sensitivity (receiver "desense") may thus result from noise interference from a nearby transmitter. As a result, received signals may become corrupted and difficult or impossible to decode. Receiver desense thus presents a challenge in mobile communication devices due to the necessary proximity of transmitter and receiver.

SUMMARY

Various embodiments include methods, and mobile communication devices implementing methods for managing an adaptive interference filter. In various embodiments methods may be performed by a processor of a mobile communication device that may include determining whether a transmission power from the mobile communication device is greater than or equal to a transmit power threshold, determining whether a ratio of interference in a received signal to a level of the received signal including noise (interference ratio) is greater than or equal to an interference ratio threshold in response to determining that the transmission power is greater than or equal to the transmit power threshold, and performing interference cancellation with the adaptive interference filter in response to determining that the interference ratio is greater than or equal to the interference ratio threshold. In some embodiments, the adaptive interference filter may include a non-linear interference cancellation scheme. In some embodiments the adaptive interference filter may be a non-linear interference cancellation scheme.

In some embodiments, determining whether an interference ratio is greater than or equal to an interference ratio threshold may include determining a level of interference in the received signal (interference level), and determining the interference ratio based on the interference level. In some embodiments determining the interference level may include enabling the adaptive interference filter to determine interference level information, disabling the adaptive interference filter, and determining the interference level based on the interference level information determined by the adaptive interference filter. In some embodiments, determining whether an interference ratio is greater than or equal to an interference ratio threshold in response to determining that the transmission power is greater than or equal to the transmit power threshold may include determining a level of the received signal including noise (signal-plus-noise level), and determining the interference ratio based on the interference level and the signal-plus-noise level.

In some embodiments, performing interference cancellation with the adaptive interference filter may include enabling the adaptive interference filter in response to determining that the interference ratio is greater than or equal to the interference ratio threshold. Some embodiments may further include initializing a timer, and re-determining the interference level in response to determining that the timer has expired. Some embodiments may include performing interference cancellation with the adaptive interference filter in response to determining that the timer has not expired.

In some embodiments the interference level may include a level of interference determined at a victim antenna of the mobile communication device. In some embodiments the interference level may include a victim desense level determined at a victim antenna of the mobile communication device.

Some embodiments may further include determining whether the device processor has changed an uplink resource block allocation, and re-determining the interference level in response to determining that the device processor has changed the uplink resource block allocation. Some embodiments may further include determining whether the device processor has changed the transmission power, and re-determining the interference level in response to determining that the device processor has changed the transmission power.

Various embodiments include a mobile computing device having a memory, an adaptive interference filter, and a processor configured to perform operations of the methods described above. Various embodiments include a mobile computing device having an adaptive interference filter and means for performing functions of the methods described above. Various embodiments include a processor-readable storage medium on which is stored processor-executable instructions configured to cause a processor of a mobile computing device to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of various embodiments.

DETAILED DESCRIPTION

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of various embodiments or the claims.

Various embodiments provide methods for adaptively managing an adaptive interference filter based on a level of interference in a victim receiver and a desired signal in order to improve performance of the filter and avoid interference created by using the adaptive interference filter under certain signal conditions.

The terms "mobile communication device" and "wireless communication device" are used interchangeably herein to refer to any one or all of cellular telephones, smart phones, personal or mobile multi-media players, personal data assistants (PDAs), laptop computers, tablet computers, smart books, palm-top computers, wireless electronic mail receivers, multimedia Internet enabled cellular telephones, wireless gaming controllers, and similar personal electronic devices that include a programmable processor and memory and circuitry for establishing wireless communication pathways and transmitting/receiving data via wireless communication pathways.

The terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

A mobile communication device may include connectors for connecting to one or more SIM cards that enable the mobile communication device to access one or more communication networks (or one or more subscriber accounts on the same network). Each SIM card may serve to identify and authenticate a subscriber using a particular communication device, and each SIM card may be associated with a subscription. In various embodiments, the mobile communication device may also include a plurality of RF resource chains that may each be used for RF reception and transmission.

A mobile communication device may be capable of communicating over a variety of frequency bands, wireless communication systems (e.g., wide area network (WAN), Wireless Fidelity (Wi-Fi), or Near Field Communication (NFC)), and radio access technologies (RATs) within a WAN (e.g., 3GPP Long Term Evolution (LTE), Global System for Mobility (GSM), and Wideband Code Division Multiple Access (WCDMA)). To use different frequency systems and/or radio access technologies, a wireless communication device may include two or more radio transceivers. A mobile communication device may suffer from interference between two communications being accomplished simultaneously, such as when one RF resource chain transmits ("Tx") at the same time as another RF resource chain is attempting to receive ("Rx"). Radio transceivers in wireless communication devices include non-linear analog components, such as power amplifiers and switches. During transmission, non-linear components may generate energy in undesired frequencies (e.g., harmonics or subharmonics of the fundamental transmission frequency) that may interfere with the operation of components of a receiver. For example, the transmitter may radiate energy at frequencies above and below its operating frequency (i.e., sideband) in addition to at its operating frequency. This band spread may fall within the passband of a nearby or co-located receiver, even if the receiver's operating frequency is several megahertz (MHz) away. Thus, the transmitter noise may appear as an "on-channel" signal at the receiver, and as a result may not be filtered out at the receiver.

The undesired energy of the transmitter may thus jam and/or desensitize a "victim" receiver. As used herein, the terms "RF self-jamming interference," "interference," "RF interference," and "RF interference event" refer to an occasion in which one RF resource chain in a mobile communication device is attempting to transmit while another RF resource chain in the mobile communication device is attempting to receive a signal. As used herein, the term "victim" refers to the RF resource chain of the mobile communication device attempting to receive during an RF interference event. Additionally, the term "aggressor" refers to the RF resource chain of the mobile communication device that is attempting to transmit.

In various embodiments, transmitter noise (e.g., an aggressor's transmissions) may compete with a signal being received (e.g., a victim's reception), which may degrade the operational performance of the receiver (i.e., may desense the victim's reception). For example, the victim may receive the aggressor's transmissions, which may cause interference and may degrade the victim's ability to receive desired signals. This interference may be in the form of blocking interference, harmonics, intermodulation distortion, power amplifier thermal noise, and other noises and distortion. Such interference may degrade the victim's receiver sensitivity, voice call quality, and data throughput. The interference may also cause higher rates for call drops and radio link failures and may cause the victim to lose a data connection.

To mitigate RF self-jamming interference, a mobile communication device may use a digital adaptive interference filter, such as, for example, a Non-Linear Interference Cancellation (NLIC) scheme. However, the adaptive interference filter is most effective at reducing high levels of RF self-jamming interference, and at low interference levels the adaptive interference filter may itself create radio noise in a receiver. Use of the adaptive interference filter is also resource intensive, and may consume additional power of the wireless communication device. Thus, the adaptive interference filter should be selectively or opportunistically enabled at high interference levels, and not enabled at low interference levels. While it is possible to characterize a specific wireless communication device's interference levels for each transmit power level and store such characterization in a lookup table, such characterization is prohibitively time intensive. Further, because specific reception and transmission hardware components vary from device to device, each model wireless communication device may require individual characterization.

Various embodiments provide systems and methods for adaptively determining or estimating a level of interference at the victim receiver as well as the desired signal and determining whether to enable or disable an adaptive interference filter. In some embodiments, a processor of a mobile communication device may determine whether to enable or disable an adaptive interference filter (e.g., an NLIC scheme) based on a real-time estimation of an interference ratio determined for one or more victim receivers. In some embodiments, the interference ratio may include an interference-to-signal-plus-noise ratio ("ISNR").

In various embodiments, the interference ratio may be calculated based on (i) an interference level (e.g., an interference power level) detected at the one or more victim receivers and (ii) a desired reception signal level (e.g., a received signal strength indicator (RSSI), a reference signal received power (RSRP), or another indication of a receive signal level). The desired reception signal level may be a signal level remaining after performing interference cancellation (i.e., after use of the adaptive interference filter). In addition, in a mobile communication device that includes multiple victim receivers, various embodiments provide real-time information about which receiver-victim antenna may be jammed the most at a particular time. The mobile communication device may use this information to select a receiver from among the multiple receivers to obtain the most reliable interference estimation.

In various embodiments, the mobile communication device may enable the adaptive interference filter for a short time to determine (e.g., to measure or to detect) the interference level at the one or more victim receivers. The mobile communication device may also determine a level of desired signal plus noise at the one or more victim receivers. The mobile communication device may calculate an interference ratio (e.g., an interference-to-signal plus noise ratio) using the interference power level(s) as well as a received signal level at the one or more victim receivers.

The mobile communication device may compare the interference ratio to an interference ratio threshold. In response to determining that the interference ratio is less than the interference ratio threshold, the mobile communication device may disable (or not enable) the adaptive interference filter. In response to determining that the interference ratio is greater than or equal to the interference ratio threshold, the mobile communication device may enable the adaptive interference filter (e.g., to cancel the undesired transmitter energy). While the adaptive interference filter is enabled, the mobile communication device may dynamically reevaluate whether to disable the adaptive interference filter based on, for example, a change in a transmit power level from the mobile communication device, a change in energy allocation among uplink resource blocks, and/or after a period of time elapses.

Figure 1:
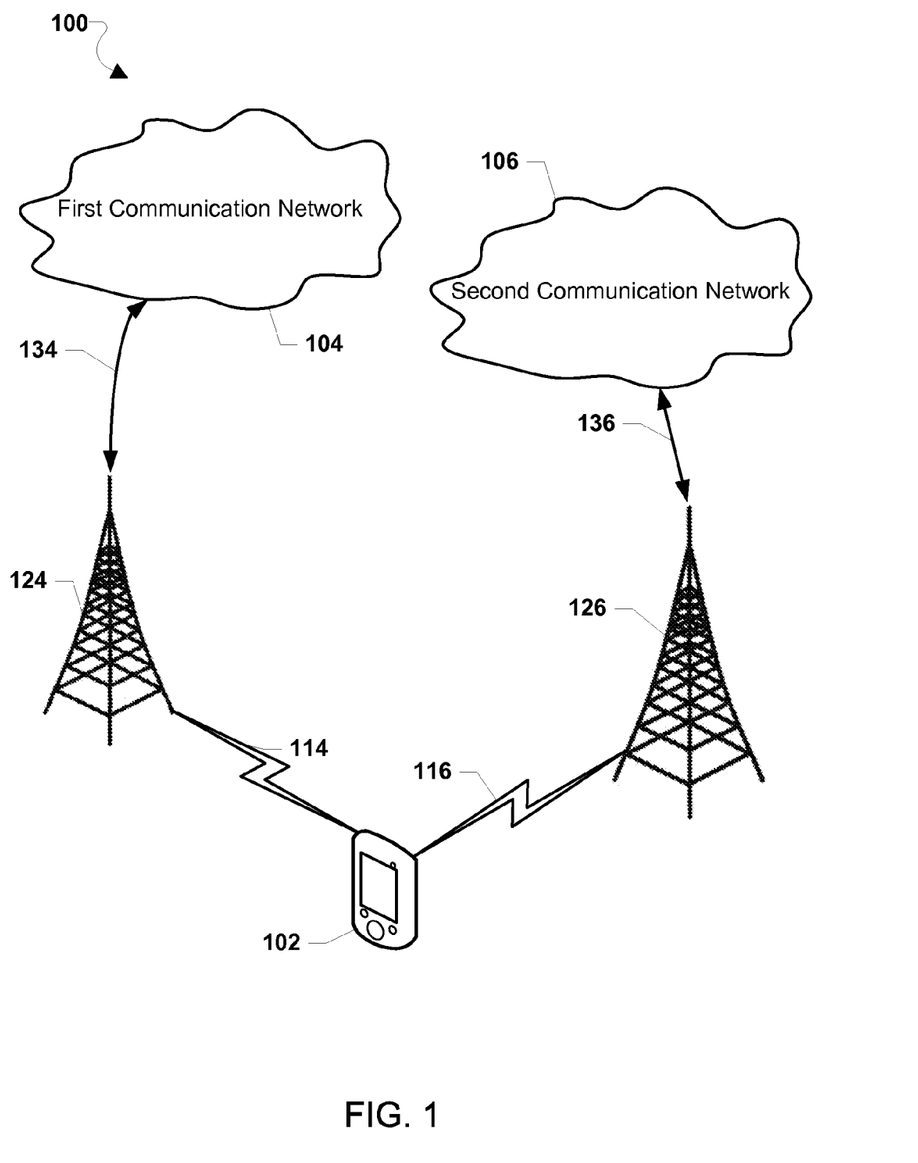
FIG. 1 is a communication system block diagram of a communication system suitable for use with various embodiments.

Various embodiments may be implemented in mobile communication devices that may operate within a variety of communication systems, particularly systems that include at least two communication networks. FIG. 1 illustrates a communication system 100 suitable for use with various embodiments. A mobile communication device 102 may communicate with a first communication network 104 and a second communication network 106. The first communication network 104 and the second communication network 106 may include a plurality of base stations (for example cellular base stations, e.g., a first base station 124 and a second base station 126).

The mobile communication device 102 may communicate with the first communication network 104 through a communication link 114 to the first base station 124, and the mobile communication device 102 may also communicate with the second communication network 106 through a communication link 116 to the second base station 126. The first base station 124 may communicate with the first communication network 104 over a wired or wireless communication link 134, which may include fiber optic backhaul links, microwave backhaul links, and other similar communication links. The second base station 126 may communicate with the second communication network 106 over a wired or wireless communication link 136 similar to the communication link 134. In some embodiments, the first and second communication networks may include mobile telephony communication networks.

While the communication links 114, 116 are illustrated as single links, each of the communication links 114, 116 may include a plurality of carrier signals, frequencies, or frequency bands, each of which may include a plurality of logical channels. Additionally, each of the communication links 114, 116 may utilize more than one radio access technology (RAT). For example, the mobile communication device 102 may receive a first carrier signal from the base station 124 and a second carrier signal from the base station 126. As another example, the mobile communication device 102 may receive the first carrier signal and the second carrier signal from the base station 124 or the base station 126.

In some embodiments, the communication links 114, 116 may include cellular communication links using a wireless communication protocol such as LTE, GSM, WCDMA, Worldwide Interoperability for Microwave Access (Wi-MAX), Code Division Multiple Access (CDMA), Time Division Multiple Access (TDMA), and other mobile telephony communication technologies. While the communication links 114, 116 are illustrated as single communication links, each of the communication links may include a plurality of frequencies or frequency bands, each of which may include a plurality of logical channels. Additionally, each of the communication links 114, 116 may utilize more than one radio access technology.

Figure 2:
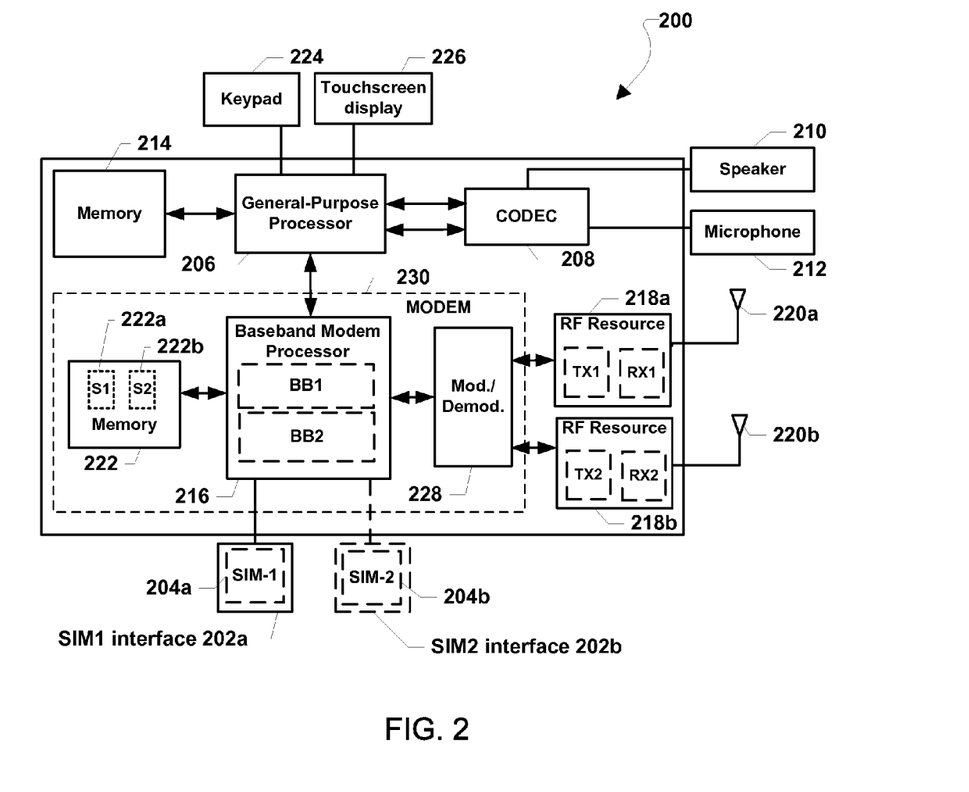
FIG. 2 is a block diagram illustrating a mobile communication device according to various embodiments.

FIG. 2 is a component block diagram of a mobile communication device 200 suitable for implementing various embodiments. With reference to FIGS. 1 and 2, in various embodiments, the mobile communication device 200 may be similar to the mobile communication device 102. The mobile communication device 200 may include a first subscriber identity module (SIM) interface 202a, which may receive a first identity module SIM-1 204a that is associated with a first subscription. The mobile communication device 200 may optionally also include a second SIM interface 202b, which may receive a second identity module SIM-2 204b that is associated with a second subscription.

A SIM in various embodiments may be a Universal Integrated Circuit Card (UICC) that is configured with SIM and/or USIM (Universal Subscriber Identity Module) applications, enabling access to, for example, GSM and/or Universal Mobile Telecommunications System (UMTS) networks. The UICC may also provide storage for a phone book and other applications. Alternatively, in a CDMA network, a SIM may be a UICC removable user identity module (R-UIM) or a CDMA subscriber identity module (CSIM) on a card. Each SIM card may have a CPU, ROM, RAM, EEPROM and I/O circuits. A SIM used in various embodiments may contain user account information, an international mobile subscriber identity (IMSI), a set of SIM application toolkit (SAT) commands and storage space for phone book contacts. A SIM card may further store a Home-Public-Land-Mobile-Network (HPLMN) code to indicate the SIM card network operator provider. An Integrated Circuit Card Identity (ICCID) SIM serial number may be printed on the SIM card for identification.

The mobile communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The memory 214 may be a non-transitory computer-readable storage medium that stores processor-executable instructions. For example, the instructions may include routing communication data relating to the first or second subscription through a corresponding baseband-RF resource chain. The memory 214 may store an operating system (OS), as well as user application software and executable instructions. The memory 214 may also store application data, such as an array data structure.

The general-purpose processor 206 may be coupled to a modem 230. The modem 230 may include at least one baseband modem processor 216, which may be coupled to a memory 222 and a modulator/demodulator 228. The baseband modem processor 216 may include physically or logically separate baseband modem processors (e.g., BB1, BB2). The modulator/demodulator 228 may receive data from the baseband modem processor 216 and may modulate a carrier signal with encoded data and provide the modulated signal to an RF resource 218a for transmission. The modulator/demodulator 228 may also extract an information-bearing signal from a modulated carrier wave received from an RF resource 218a, and may provide the demodulated signal to the baseband modem processor 216. The modulator/demodulator 228 may be or include a digital signal processor (DSP).

The baseband modem processor 216 may read and write information to and from the memory 222. The memory 222 may also store instructions associated with a protocol stack, such as protocol stack S1 222a and protocol stack S2 222b. A protocol stack generally includes computer executable instructions to enable communication using a radio access protocol or communication protocol. Each protocol stack 222a, 222b typically includes network protocol layers structured hierarchically to provide networking capabilities. The modem 230 of a mobile communication device 200 may include one or more protocol stacks 222a, 222b to enable communication using one or more radio access technologies.

A protocol stack 222a, 222b may be associated with a SIM card 204a, 204b and/or a subscription. For example, the protocol stack S1 222a and the protocol stack S2 222b may be associated with the SIM-1 204a. The illustration of only two protocol stacks S1 and S2 is not intended as a limitation, and the memory 222 may store more than two protocol stacks (not illustrated). For example, the memory 222 may store a first plurality of protocol stacks, which may be associated with the SIM-1 204a, and a second plurality of protocol stacks, which may be associated with the SIM-2 204b. The mobile communication device 200 may include one or more protocol stacks associated with a subscription to enable communication with a communication network associated with the subscription using one or more radio access technologies.

Each SIM and/or RAT in the mobile communication device 200 (e.g., SIM-1 204a and SIM-2 204b) may be coupled to the modem 230 and may be associated with or permitted to use an RF resource chain. For example, a first RAT (e.g., a GSM RAT) may be associated with RF resource 218a, and a second RAT (e.g., a CDMA or WCDMA RAT) may be associated with RF resource 218b.

Each baseband-RF resource chain may include the baseband modem processor 216 to perform baseband/modem functions for communicating with/controlling a RAT, and one or more amplifiers and radios, referred to generally herein as RF resources. In some embodiments, baseband-RF resource chains may share a common baseband modem processor 216 (i.e., a single device that performs baseband/modem functions for all RATs on the wireless communication device). Alternatively, each baseband-RF resource chain may include the physically or logically separate baseband processors (e.g., BB1, BB2).

The RF resources 218a, 218b may be transceivers associated with one or more RATs and may perform transmit/receive functions for the mobile communication device 200 on behalf of their respective RATs. The RF resources 218a, 218b may include separate transmit and receive circuitry. The RF resources 218a, 218b may each be coupled to a wireless antenna (e.g., a first wireless antenna 220a and a second wireless antenna 220b). The RF resources 218a, 218b may also be coupled to the modem 230 (e.g., via the modulator/demodulator 228, or alternatively via the baseband modem processor 216 or another component). The term "RF resource chain" may refer to an RF resource (e.g., the RF resource 218a, 218b), an antenna (e.g., the antennas 220a, 220b), and one or more components of the modem 230.

In some embodiments, the general-purpose processor 206, memory 214, baseband processor(s) 216, and RF resources 218a, 218b may be included in the mobile communication device 200 as a system-on-chip. In some embodiments, the first and second SIMs 204a, 204b and their corresponding interfaces 202a, 202b may be external to the system-on-chip. Further, various input and output devices may be coupled to components on the system-on-chip, such as interfaces or controllers. Example user input components suitable for use in the mobile communication device 200 may include, but are not limited to, a keypad 224 and a touchscreen display 226.

In some embodiments, the keypad 224, touchscreen display 226, microphone 212, or a combination thereof, may perform the function of receiving the request to initiate an outgoing call. For example, the touchscreen display 226 may receive a selection of a contact from a contact list or receive a telephone number. In another example, either or both of the touchscreen display 226 and microphone 212 may perform the function of receiving a request to initiate an outgoing call. For example, the touchscreen display 226 may receive a selection of a contact from a contact list or receive a telephone number. As another example, the request to initiate the outgoing call may be in the form of a voice command received via the microphone 212. Interfaces may be provided between the various software modules and functions in the mobile communication device 200 to enable communication between them.

Functioning together, the two SIMs 204a, 204b, baseband processor BB1, BB2, RF resources 218a, 218b, and antennas 220a, 220b may constitute two or more RATs. For example, one SIM, baseband processor, and RF resource may be configured to support two different radio access technologies. In other embodiments, more RATs may be supported on the mobile communication device 200 by adding more SIM cards, SIM interfaces, RF resources, and antennae for connecting to additional mobile networks.

Figure 3:
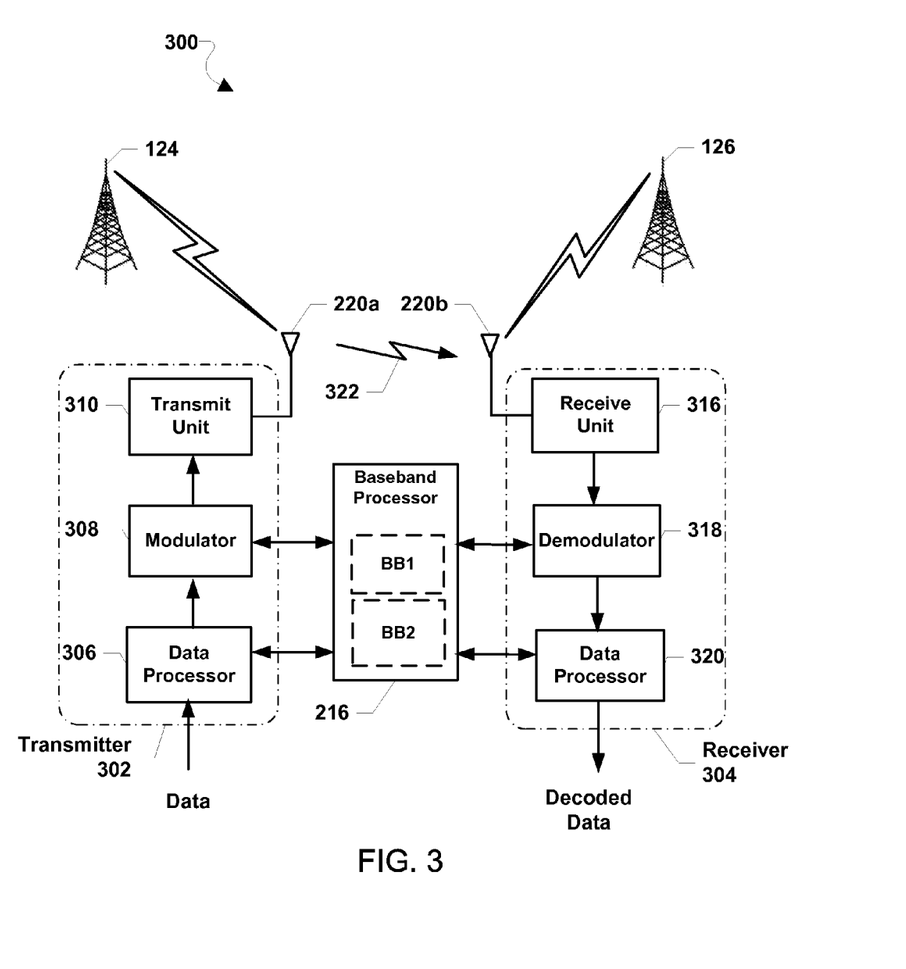
FIG. 3 is a block diagram illustrating transmit and receive components in separate RF resource chains in a mobile communication device according to various embodiments.

FIG. 3 illustrates a block diagram 300 of transmit and receive components in separate RF resources suitable for implementing various embodiments. With reference to FIGS. 1-3, in various embodiments, the transmit and receive components may be implemented in a mobile communication device similar to one or more of the mobile communication devices 102, 200.

One RF resource (e.g., the RF resource 218a) may include a transmitter 302, and another RF resource (e.g., the RF resource 218b) may include a receiver 304. In a particular embodiment, the transmitter 302 may include a data processor 306 that may format, encode, and interleave data to be transmitted. The transmitter 302 may include a modulator 308 that modulates a carrier signal with encoded data, for example, by performing Gaussian minimum shift keying (GMSK). One or more transmit units 310 (e.g., transmit circuitry) may condition the modulated signal (e.g., by filtering, amplifying, and upconverting) to generate a RF modulated signal for transmission, e.g., to the base station 124 via the antenna 220a.

At the receiver 304, the antenna 220b may receive RF modulated signals, such as from the base station 126. One or more receive units 316 (e.g., receive circuitry) may condition (e.g., filter, amplify, and downconvert) the received RF modulated signal, digitize the conditioned signal, and provide samples to a demodulator 318. The demodulator 318 may extract the original information-bearing signal from the modulated carrier wave, and may provide the demodulated signal to a data processor 320. The data processor 320 may de-interleave and decode the received signal to obtain the original, decoded data, and may provide decoded data to other components in the wireless communication device. Operations of the transmitter and the receiver may be controlled by a processor, such as the baseband processor(s) 216. In various embodiments, each of the transmitter 302 and receiver 304 may be implemented as circuitry that may be separated from their corresponding receive and transmit circuitries (not shown). Alternatively, the transmitter 302 and the receiver 304 may be respectively combined with corresponding receive circuitry and transmit circuitry (e.g., as transceivers associated with SIM-1 and SIM-2, for example, the RF resources 218a and 218b).

The antenna 220b may also receive some RF signals 322 emitted from the transmitter 302, which may compete with a desired signal from the base station 126. Receiver desense may occur when a signal transmitted on an uplink from the transmitter 302 interferes with receive activity on the receiver 304. Desired signals may become corrupted and difficult or impossible to decode.

Figure 4:
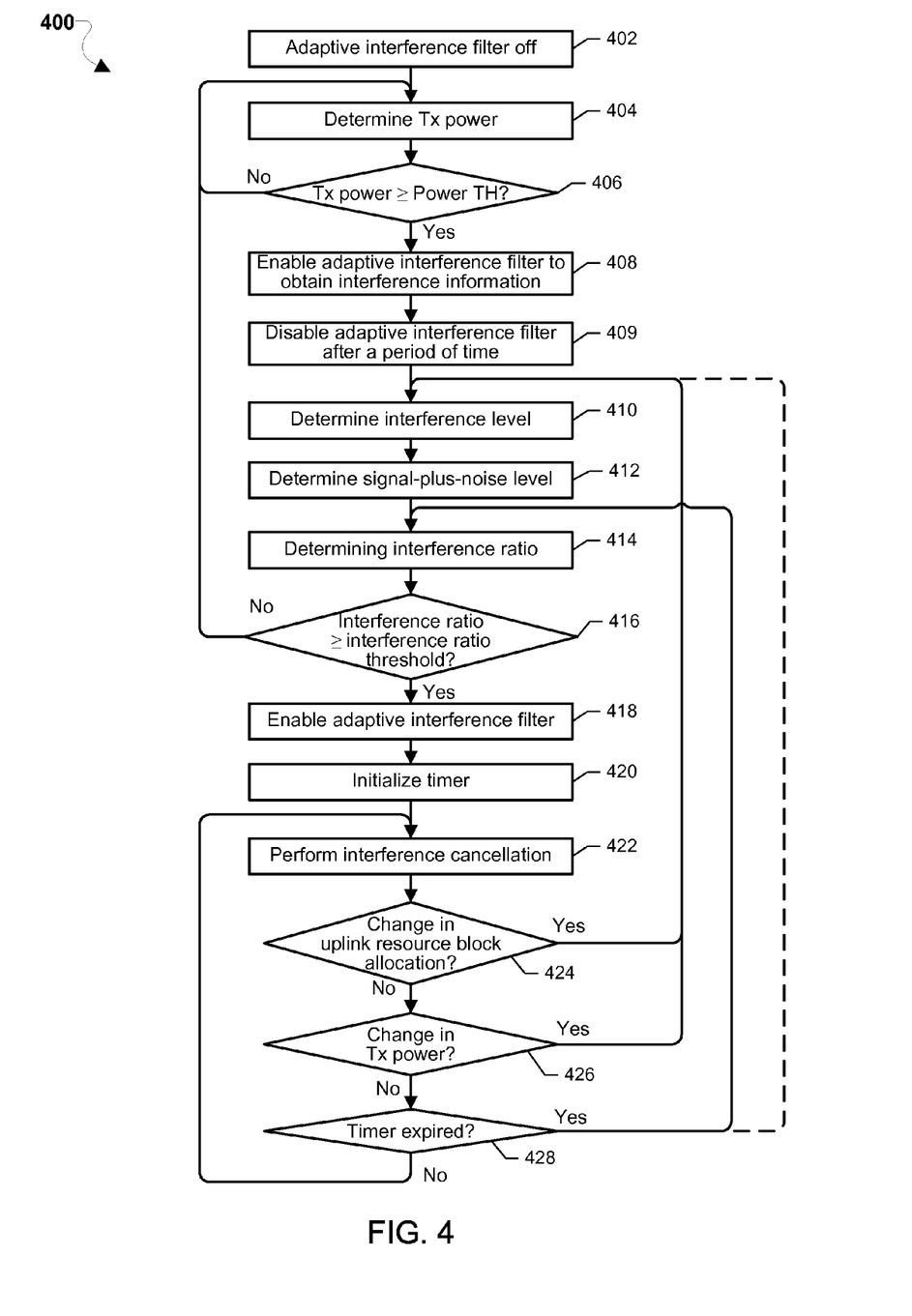
FIG. 4 is a process flow diagram illustrating a method for managing an adaptive interference filter according to various embodiments.

FIG. 4 is a process flow diagram illustrating a method 400 for managing an adaptive interference filter in a mobile communication device according to some embodiments. With reference to FIGS. 1-4, the method 400 may be implemented by a processor (e.g., the general-purpose processor 206, the baseband modem processor 216, a separate controller, and/or the like) of a mobile communication device (e.g., the mobile communication devices 102, 200).

In block 402, the device processor may set a state of an adaptive interference filter to "off" (i.e., the device processor may deactivate or disable the adaptive interference filter, or may confirm that the adaptive interference filter is deactivated or disabled).

In block 404, the device processor may determine a transmission (Tx) power from the mobile communication device. The Tx power may include a power level at which a signal is transmitted from the mobile communication device by a Tx resource chain, which may include, for example, the antenna 220a, 220b. In some embodiments, the device processor may determine a scheduled Tx power level (i.e., a Tx power level that is scheduled to be used in a future signal transmission from the mobile communication device).

In determination block 406, the device processor may determine whether the Tx power is greater than or equal to a power threshold (TH). In some embodiments, the power threshold may be set based on a power level at which one or more components of the RF resource chain used to transmit the signal begin to behave non-linearly. In such cases, when the Tx power is below the power threshold, the one or more components of the RF resource chain may behave linearly, and when the Tx power is greater than or equal to the power threshold, the one or more components of the RF resource chain may behave non-linearly.

In response to determining that the Tx power is not greater than or equal to the power threshold (i.e., determination block 406="No"), the device processor may return to block 404 and determine another Tx power.

In response to determining that the Tx power is greater than or equal to the power threshold (i.e., determination block 406="Yes"), the device processor may enable the adaptive interference filter in order to obtain information about the interference signals in block 408. For example, the device processor may enable the adaptive interference filter for a relatively short period of time sufficient to enable the adaptive interference filter to estimate an aggressor signal that would need to be subtracted from a received signal to remove the interference. The aggressor signal will include the transmitted signal with the Tx power, and may also include other signals, such as internal electronic noise, external interference, and thermal interference. This estimate of the aggressor signal (or signal characteristics of the aggressor signal) may be used to obtain information about the magnitude or level of interference present in the received signal. In some embodiments, the device processor may use one or more filter coefficients and/or other statistics generated by the adaptive interference filter to determine information about the interference level. In some embodiments, the short period of time during which the adaptive interference filter is enabled may range from (but is not limited to) 1 millisecond to 100 milliseconds. In some embodiments, the adaptive interference filter may include an NLIC filter.

In block 409, after enabling the adaptive interference filter for the relatively short period of time and obtaining interference level information, the device processor may disable the adaptive interference filter. Disabling the adaptive interference filter saves power when the filter is not required.

In block 410, the device processor may determine a magnitude or level of interference in a received signal ("interference level") using the interference information determined from the adaptive interference filter. In some embodiments, the interference level may include an interference power level. In some embodiments, the interference level information may be provided by the adaptive interference filter, such as parameters of the filter (i.e., parameters or coefficients that characterize the filter), which may be inherent parameters. In some embodiments, the interference level may include a level of interference determined at a victim antenna of the mobile communication device. In some embodiments, the interference level may include a victim desense level determined at the victim antenna of the mobile communication device. In some embodiments, the interference level may include a level of interference detected using the adaptive interference filter in the one or more bands of a communication link used by the receiver RF resource chain of the mobile communication device.

The device processor may use various techniques to compute the interference level. For example, the device processor may compute interference level using a least-square solution. In some embodiments, the least-square solution may include a matrix calculation. In some embodiments, the least-square solution may include a vector calculation.

In block 412, the device processor may determine a magnitude or level of the received signal including the target signal and all noise ("signal-plus-noise level"). In some embodiments, the device processor may determine a signal level of a desired signal (e.g., the desired signal received by the receiver 304 from the base station 126) and a noise level (e.g., a thermal noise level) associated with the desired signal. In some embodiments, the device processor may determine the signal-plus-noise level from information obtained by enabling the adaptive interference filter and by detecting the power of the residual signal post cancellation (e.g., after application of the adaptive interference filter). In some embodiments, the signal-plus-noise level may be determined from a signal level after use of the adaptive interference filter (e.g., after performing interference cancellation using the adaptive interference filter).

In block 414, the device processor may determine a ratio of interference in a received signal to a level of the signal including noise ("interference ratio"). The interference ratio may serve as a determination of the severity of interference experienced by a victim receiver. The interference ratio may be based on the determined interference level and/or the determined signal-plus-noise level. In some embodiments, the interference ratio may also be expressed as an interference to signal-plus-noise ratio (ISNR). In some embodiments, the interference ratio may be calculated as I/(S+N), where I represents the determined interference level, S represents the determined signal level, and N represents the determined noise level.

In block 416, the device processor may determine whether the interference ratio is greater than or equal to an interference ratio threshold. The interference ratio threshold may be stored in a memory (e.g., 214) of the mobile communication device. The interference ratio threshold may be based on a signal gain that may be achieved in the desired signal (i.e., the desired signal received by the receiver 304 from the base station 126) by performing interference cancellation using the adaptive interference filter.

In some embodiments, the signal gain may refer to an increase in the SINR (Signal to Interference plus Noise Ratio) after performing interference cancellation compared to the SINR before interference cancellation. The amount of signal gain resulting from the performance of interference cancellation using the adaptive interference filter may decrease as the signal level of the desired signal increases for a fixed Tx power. For example, the adaptive interference filter may cancel (i.e., reduce) the interference level (i.e., the "I" value in SINR) without affecting the values of the signal ("S") or noise ("N").

Below the interference ratio threshold, performing interference cancellation using the adaptive interference filter may not improve the signal gain of the desired signal level. For example, where SINR=S/(I+N), when the interference ratio is below the interference ratio threshold, use of the adaptive interference filter may not provide any substantial improvement in the SINR. In some embodiments, performing interference cancellation when the interference ratio is below the interference ratio threshold may reduce the SINR associated with the desired signal level without interference cancellation.

In response to determining that the interference ratio is not greater than or equal to the interference ratio threshold (i.e., determination block 416="No"), the device processor may again determine the Tx power of the signal being transmitted or to be transmitted from the mobile communication device in block 404.

Above the interference ratio threshold, performing interference cancellation using the adaptive interference filter may improve the SINR of the desired signal level. Therefore, in response to determining that the interference ratio is greater than or equal to than the interference ratio threshold (i.e., determination block 416="Yes"), the device processor may enable the adaptive interference filter in block 418.

In some embodiments, the device processor may calculate an interference ratio on a per-receiver basis. For example, the mobile communication device may include two or more receivers (e.g., similar to the receiver 304), each of which may be a victim receiver, and each of which may be desensed by the transmitter (e.g., the transmitter 302) to a different degree. In some embodiments, the device processor may perform the operations of blocks 410-418 for each of two or more receivers of the mobile communication device, and the device processor may enable or disable the adaptive interference filter individually and/or autonomously for each of the two or more receivers.

In block 420, the processor may initialize a timer. The processor may perform interference cancellation (via the adaptive interference filter) on the victim receiver in block 422.

In some embodiments, in determination block 424, the device processor may determine whether there is any change in an uplink resource block allocation. For example, the device processor may determine whether resource blocks have been allocated for transmission of a signal from the transmitter 302.

In response to determining that there is a change in the uplink resource block allocation (i.e., determination block 424="Yes"), the device processor may again determine the interference level in block 410, determine the signal-plus-noise level in block 412 and determine the interference ratio, such as the ISNR, in block 414. Because the adaptive interference filter is enabled (block 418) and the device processor is performing interference cancellation, the device processor may obtain the interference level (block 410), and the signal level and the noise level (block 412) needed to calculate the interference ratio in block 414 from the adaptive interference filter information.

In response to determining that there is no change in the uplink resource block allocation (i.e., determination block 424="No"), the device processor may determine whether there is a change in the Tx power in determination block 426. In response to determining that there is a change in the Tx power (i.e., determination block 426="Yes"), the device processor may again determine the interference level in block 410, determine the signal-plus-noise level in block 412, and calculate the interference ratio, such as the ISNR, in block 414. Because the adaptive interference filter is enabled (block 418) and the device processor is performing interference cancellation, the device processor may obtain the interference level (block 410) and the signal level and the noise level (block 412) needed to determine the interference ratio in block 414 from the adaptive interference filter information.

In various embodiments, determinations in determination blocks 424 and 426 may be performed in either order. Also, either of both of the determinations in determination blocks 424 and 426 may not be performed in some embodiments.

In response to determining that there is no change in the Tx power (i.e., determination block 426="No"), the device processor may determine whether the timer has expired. In response to determining that timer has not expired (i.e., determination block 428="No"), the device processor may continue to perform interference cancellation in block 422.

In response to determining that the timer has expired (i.e., determination block 428="Yes"), the device processor may again calculate the interference ratio in block 414.

In some embodiments, in response to determining that the timer has expired (i.e., determination block 428="Yes"), the device processor may again determine the interference level in block 410, determine the signal-plus-noise level in block 412, and calculate the interference ratio, such as the ISNR, in block 414. Because the adaptive interference filter is enabled (block 418) and the device processor is performing interference cancellation, the device processor may obtain interference level (block 410) and the signal level and the noise level (block 412) needed to determine the interference ratio in block 414 from the adaptive interference filter information.

By re-determining the interference ratio in block 414 and again determining whether the interference ratio equals or exceeds the interference threshold in determination block 416 after a change in uplink resource blocks (i.e., determination block 424="Yes"), or after a change in transmit power (i.e., determination block 426="Yes"), or at least periodically (i.e., determination block 426="Yes"), the adaptive interference filter may be turned off when the interference conditions permit (i.e., determination block 426="No"). Turning off the adaptive interference filter when the filter is not required enables the mobile communication device to save battery power and computing resources.

Using methods of various embodiments the adaptive interference filter may be managed by the device processor automatically and dynamically. Dynamically managing use of the adaptive interference filter may reduce or obviate the need to perform manual characterization of interference levels for various Tx powers of a specific multi-subverting communication device. Further, dynamically managing use of the adaptive interference filter enables the device processor to consider interference in the field, environmental conditions such as RF conditions of the transmit and receive communication links, interference that may be generated by a user's body, and other environmental conditions. Thus, dynamically managing use of the adaptive interference filter provides substantially more accurate and effective results than manual characterization of interference levels, as well as preserving power storage of the mobile communication device.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

Figure 5:
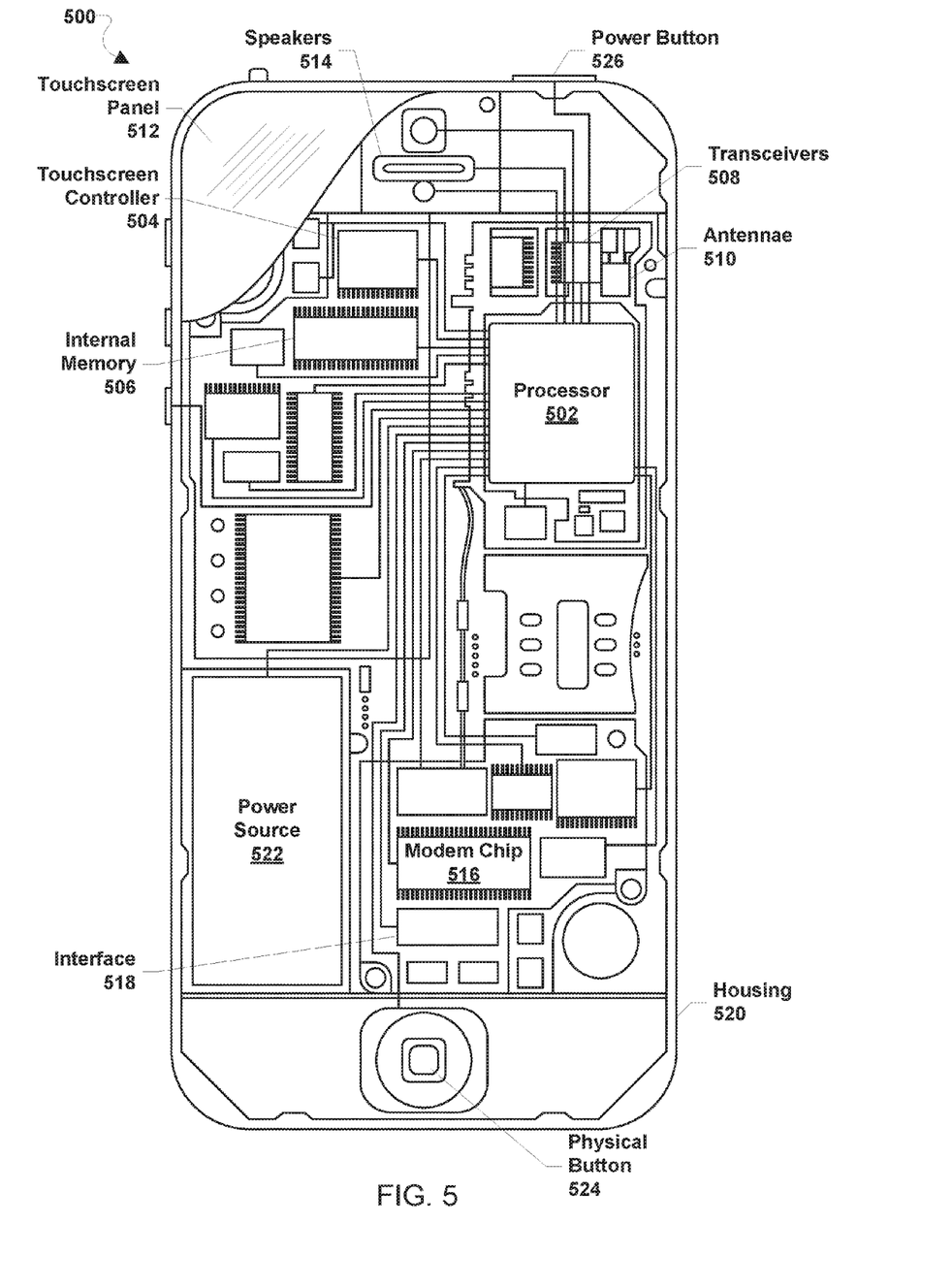
FIG. 5 is a component diagram of an example mobile communication device suitable for use with the various aspects.

Various embodiments (including, but not limited to, embodiments discussed above with reference to FIGS. 1-4) may be implemented in any of a variety of mobile communication devices, an example of which (e.g., mobile communication device 500) is illustrated in FIG. 5. With reference to FIGS. 1-5, in various embodiments, the mobile communication device 500 (which may correspond, for example, to the multi-subscription communication devices 102 and 200) may include a processor 502 coupled to a touchscreen controller 504 and an internal memory 506. The processor 502 may be one or more multi-core integrated circuits designated for general or specific processing tasks. The internal memory 506 may be volatile or non-volatile memory, and may also be secure and/or encrypted memory, or unsecure and/or unencrypted memory, or any combination thereof. The touchscreen controller 504 and the processor 502 may also be coupled to a touchscreen panel 512, such as a resistive-sensing touchscreen, capacitive-sensing touchscreen, infrared sensing touchscreen, etc. Additionally, the display of the mobile communication device 500 need not have touch screen capability.

The mobile communication device 500 may have two or more radio signal transceivers 508 (e.g., Peanut, Bluetooth, ZigBee, Wi-Fi, RF radio) and antennae 510, for sending and receiving communications, coupled to each other and/or to the processor 502. The transceivers 508 and antennae 510 may be used with the above-mentioned circuitry to implement the various wireless transmission protocol stacks and interfaces. The mobile communication device 500 may include one or more cellular network wireless modem chip(s) 516 coupled to the processor and antennae 510 that enable communication via two or more cellular networks via two or more radio access technologies.

The mobile communication device 500 may include a peripheral device connection interface 518 coupled to the processor 502. The peripheral device connection interface 516 may be singularly configured to accept one type of connection, or may be configured to accept various types of physical and communication connections, common or proprietary, such as USB, FireWire, Thunderbolt, or PCIe. The peripheral device connection interface 516 may also be coupled to a similarly configured peripheral device connection port (not shown).

The mobile communication device 500 may also include speakers 514 for providing audio outputs. The mobile communication device 500 may also include a housing 520, constructed of a plastic, metal, or a combination of materials, for containing all or some of the components discussed herein. The mobile communication device 500 may include a power source 522 coupled to the processor 502, such as a disposable or rechargeable battery. The rechargeable battery may also be coupled to the peripheral device connection port to receive a charging current from a source external to the mobile communication device 500. The mobile communication device 500 may also include a physical button 524 for receiving user inputs. The mobile communication device 500 may also include a power button 526 for turning the mobile communication device 500 on and off.

The processor 502 may be any programmable microprocessor, microcomputer or multiple processor chip or chips that can be configured by software instructions (applications) to perform a variety of functions, including the functions of various embodiments described below. In some mobile communication devices, multiple processors 502 may be provided, such as one processor dedicated to wireless communication functions and one processor dedicated to running other applications. Typically, software applications may be stored in the internal memory 506 before they are accessed and loaded into the processor 502. The processor 502 may include internal memory sufficient to store the application software instructions.

Various embodiments may be implemented in any number of single or multi-processor systems. Generally, processes are executed on a processor in short time slices so that it appears that multiple processes are running simultaneously on a single processor. When a process is removed from a processor at the end of a time slice, information pertaining to the current operating state of the process is stored in memory so the process may seamlessly resume its operations when it returns to execution on the processor. This operational state data may include the process's address space, stack space, virtual address space, register set image (e.g., program counter, stack pointer, instruction register, program status word, etc.), accounting information, permissions, access restrictions, and state information.

A process may spawn other processes, and the spawned process (i.e., a child process) may inherit some of the permissions and access restrictions (i.e., context) of the spawning process (i.e., the parent process). A process may be a heavyweight process that includes multiple lightweight processes or threads, which are processes that share all or portions of their context (e.g., address space, stack, permissions, and/or access restrictions, etc.) with other processes/threads. Thus, a single process may include multiple lightweight processes or threads that share, have access to, and/or operate within a single context (i.e., the processor's context).

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the spirit or scope of the embodiments. Thus, various embodiments are not intended to be limited to the embodiments shown herein but are to be accorded the widest scope consistent with the following claims and the principles and novel features disclosed herein.

What is claimed is:

1. A method of managing an adaptive interference filter performed by a processor of a mobile communication device, comprising:
   determining whether a transmission power from the mobile communication device is greater than or equal to a transmit power threshold;
   determining whether a ratio of interference in a received signal to a level of the received signal including noise (interference ratio) is greater than or equal to an interference ratio threshold in response to determining that the transmission power is greater than or equal to the transmit power threshold; and
   performing interference cancellation with the adaptive interference filter in response to determining that the interference ratio is greater than or equal to the interference ratio threshold.

2. The method of claim 1, wherein the adaptive interference filter comprises a non-linear interference cancellation filter.

3. The method of claim 1, wherein performing interference cancellation with the adaptive interference filter comprises:
   enabling the adaptive interference filter in response to determining that the interference ratio is greater than or equal to the interference ratio threshold.

4. The method of claim 3, further comprising:
   initializing a timer; and re-determining the interference ratio in response to determining that the timer has expired.

5. The method of claim 4, further comprising performing interference cancellation with the adaptive interference filter in response to determining that the timer has not expired.

6. The method of claim 1, wherein determining whether an interference ratio is greater than or equal to an interference ratio threshold in response to determining that the transmission power is greater than or equal to the transmit power threshold comprises:
   determining a level of interference in the received signal (interference level); and
   determining the interference ratio based on the interference level.

7. The method of claim 6, wherein determining the interference level comprises:
   enabling the adaptive interference filter to determine interference level information from parameters of the adaptive interference filter;
   disabling the adaptive interference filter; and
   determining the interference level based on the interference level information.

8. The method of claim 6, wherein determining whether an interference ratio is greater than or equal to an interference ratio threshold in response to determining that the transmission power is greater than or equal to the transmit power threshold comprises:
   determining the level of the received signal including noise (signal-plus-noise level); and
   determining the interference ratio based on the interference level and the signal-plus-noise level.

9. The method of claim 6, wherein performing interference cancellation with the adaptive interference filter comprises:
   enabling the adaptive interference filter in response to determining that the interference ratio is greater than or equal to the interference ratio threshold.

10. The method of claim 9, further comprising:
    initializing a timer; and
    re-determining the interference level in response to determining that the timer has expired.

11. The method of claim 6, further comprising:
    determining whether the mobile communication device has changed an uplink resource block allocation; and
    re-determining the interference level in response to determining that the mobile communication device has changed the uplink resource block allocation.

12. The method of claim 6, further comprising:
    determining whether the device processor has changed the transmission power; and
    re-determining the interference level in response to determining that the device processor has changed the transmission power.

13. The method of claim 6, wherein the interference level comprises a level of interference determined at a victim antenna of the mobile communication device.

14. The method of claim 6, wherein the interference level comprises a victim desense level determined at a victim antenna of the mobile communication device.

15. A mobile communication device, comprising:
    a memory;
    an adaptive interference filter; and
    a processor coupled to the memory and the adaptive interference filter, wherein the processor is configured with processor-executable instructions to:
       determine whether a transmission power from the mobile communication device is greater than or equal to a transmit power threshold;
       determine whether a ratio of interference in a received signal to a level of the received signal including noise (interference ratio) is greater than or equal to an interference ratio threshold in response to determining that the transmission power is greater than or equal to the transmit power threshold; and
       perform interference cancellation with the adaptive interference filter in response to determining that the interference ratio is greater than or equal to the interference ratio threshold.

16. The mobile communication device of claim 15, wherein the adaptive interference filter comprises a non-linear interference cancellation scheme.

17. The mobile communication device of claim 15, wherein the processor is further configured with processor-executable instructions to perform interference cancellation with the adaptive interference filter by:
    enabling the adaptive interference filter in response to determining that the interference ratio is greater than or equal to the interference ratio threshold.

18. The mobile communication device of claim 17, wherein the processor is further configured with processor-executable instructions to
    initialize a timer; and
    redetermine the interference ratio in response to determining that the timer has expired.

19. The mobile communication device of claim 18, wherein the processor is further configured with processor-executable instructions to perform interference cancellation with the adaptive interference filter in response to determining that the timer has not expired.

20. The mobile communication device of claim 15, wherein the processor is further configured with processor-executable instructions to determine whether an interference ratio is greater than or equal to an interference ratio threshold in response to determining that the transmission power is greater than or equal to the transmit power threshold by:
    determining a level of interference in the received signal (interference level); and
    determining the interference ratio based on the interference level.

21. The mobile communication device of claim 20, wherein the processor is further configured with processor-executable instructions to determine the interference level by:
    enabling the adaptive interference filter to determine interference level information from parameters of the adaptive interference filter;
    disabling the adaptive interference filter; and
    determining the interference level based on the interference level information.

22. The mobile communication device of claim 20, wherein the processor is further configured with processor-executable instructions to determine whether an interference ratio is greater than or equal to an interference ratio threshold in response to determining that the transmission power is greater than or equal to the transmit power threshold by:
    determining the level of the received signal including noise (signal-plus-noise level); and
    determining the interference ratio based on the interference level and the signal-plus-noise level.

23. The mobile communication device of claim 20, wherein the processor is further configured with processor-executable instructions to perform interference cancellation with the adaptive interference filter by:

enabling the adaptive interference filter in response to determining that the interference ratio is greater than or equal to the interference ratio threshold.

24. The mobile communication device of claim 23, wherein the processor is further configured with processor-executable instructions to:

initializing a timer; and re-determining the interference level in response to determining that the timer has expired.

25. The mobile communication device of claim 20, wherein the processor is further configured with processor-executable instructions to:

determine whether an uplink resource block allocation has been changed; and re-determine the interference level in response to determining that the uplink resource block allocation has been changed.

26. The mobile communication device of claim 20, wherein the processor is further configured with processor-executable instructions to:

determine whether the transmission power has changed; and redetermine the interference level in response to determining that the transmission power has changed.

27. The mobile communication device of claim 20, wherein the interference level comprises a level of interference determined at a victim antenna of the mobile communication device.

28. The mobile communication device of claim 20, wherein the interference level comprises a victim desense level determined at a victim antenna of the mobile communication device.

29. A mobile communication device, comprising:

an adaptive interference filter;

means for determining whether a transmission power from the mobile communication device is greater than or equal to a transmit power threshold;

means for determining whether a ratio of interference in a received signal to a level of the received signal including noise (interference ratio) is greater than or equal to an interference ratio threshold in response to determining that the transmission power is greater than or equal to the transmit power threshold; and means for performing interference cancellation with the adaptive interference filter in response to determining that the interference ratio is greater than or equal to the interference ratio threshold.

30. A non-transitory processor-readable storage medium having stored thereon processor-executable instructions configured to cause a processor of a mobile communication device to perform operations comprising:

determining whether a transmission power from the mobile communication device is greater than or equal to a transmit power threshold;

determining whether a ratio of interference in a received signal to a level of the received signal including noise (interference ratio) is greater than or equal to an interference ratio threshold in response to determining that the transmission power is greater than or equal to the transmit power threshold; and performing interference cancellation with an adaptive interference filter in response to determining that the interference ratio is greater than or equal to the interference ratio threshold.

* * * * *